US006963603B1

(12) United States Patent
Rezvani et al.

(10) Patent No.: US 6,963,603 B1
(45) Date of Patent: Nov. 8, 2005

(54) METHOD AND APPARATUS FOR PRE-COMPENSATION OF AN XDSL MODEM

(75) Inventors: Behrooz Rezvani, Pleasanton, CA (US); Sam Heidari, Menlo Park, CA (US); Dale Smith, Fremont, CA (US)

(73) Assignee: Ikanos Communication, Inc., Fremont, CA (US)

( * ) Notice: Subject to any disclaimer, the term of this patent is extended or adjusted under 35 U.S.C. 154(b) by 722 days.

(21) Appl. No.: 09/876,263

(22) Filed: Jun. 6, 2001

Related U.S. Application Data

(60) Provisional application No. 60/209,918, filed on Jun. 6, 2000.

(51) Int. Cl.[7] .................................. H04B 1/38
(52) U.S. Cl. .................. 375/222; 375/232; 375/260; 375/295; 370/206; 370/248
(58) Field of Search ................ 375/222, 232, 375/260, 295; 370/206, 210, 232, 248; 379/1.01, 379/1.03, 1.04

(56) References Cited

U.S. PATENT DOCUMENTS

| 5,113,414 | A |   | 5/1992  | Karam et al. ............. 375/60 |
| 5,574,990 | A |   | 11/1996 | Flanagan ................. 455/115 |
| 5,825,826 | A | * | 10/1998 | May et al. ................ 375/295 |
| 6,075,411 | A |   | 6/2000  | Briffa et al. |
| 6,141,377 | A |   | 10/2000 | Sharper et al. ........... 375/222 |
| 6,263,077 | B1 |  | 7/2001  | Zuranski et al. |
| 6,295,326 | B1 |  | 9/2001  | Tonissen et al. |
| 6,366,554 | B1 | * | 4/2002  | Isaksson et al. ........... 370/206 |
| 6,381,268 | B2 |  | 4/2002  | Polley et al. |
| 6,389,062 | B1 |  | 5/2002  | Wu |
| 6,411,657 | B1 |  | 6/2002  | Verbin et al. |
| 6,480,532 | B1 |  | 11/2002 | Vareljian |
| 6,512,739 | B1 | * | 1/2003  | Heidari et al. ............. 370/210 |
| 6,516,049 | B1 | * | 2/2003  | Heidari et al. ............. 379/1.01 |
| 6,549,512 | B2 | * | 4/2003  | Wu et al. ................ 370/210 |
| 6,754,261 | B1 | * | 6/2004  | Liu et al. ................ 375/232 |

* cited by examiner

*Primary Examiner*—Shuwang Liu
(74) *Attorney, Agent, or Firm*—IP Creators; Charles C. Cary

(57) ABSTRACT

An apparatus and method is provided for minimizing frequency distortion in the transmit path of an XDSL modem implementing digital multi-tone (DMT) line code. The current invention provides a means for both determining and correcting for distortion in the frequency domain. The apparatus may be incorporated in an existing X-DSL architecture without additional circuitry. In an embodiment of the invention the apparatus may include a calibration phase which may be implemented using the existing analog-to-digital (ADC) conversion and demodulation capabilities on the receive path of the modem. This calibration phase takes place before the training phase associated with establishing communications with a remote site. During the calibration phase a calibration sequence with known spectral characteristics in the frequency domain is injected digitally at the beginning of the transmit path into each of the tone bins of the inverse Fourier Transform engine (IFFT). The receive path is configured to receive feedback of a resultant analog output signal from the transmit path. A frequency analyzer is used to determine the spectral properties of the feedback from the analog output signal and a normalizer is used to compute a local gain table with gain factors for each tone bin which effect the required normalization.

14 Claims, 4 Drawing Sheets

**Transmit Power Spectrum
(No Precompensation)**

**Transmit Power Spectrum
(With Precompensation)**

METHOD AND APPARATUS FOR PRE-COMPENSATION OF AN XDSL MODEM

CROSS REFERENCE TO RELATED APPLICATION

This application claims the benefit of prior filed co-pending Provisional Application No. 60/209,918 filed on Jun. 6, 2000 entitled "Transmit filtering for ADSL VDSL APPLICATIONS" which is incorporated herein by reference in their entirety as if fully set forth herein.

BACKGROUND OF THE INVENTION

1. Field of Invention

The field of the present invention relates in general to communication systems and more particularly to pre-compensation systems for the transmit path of an XDSL modem.

2. Description of the Related Art

Digital Subscriber Lines (DSL) technology and improvements thereon including: G.Lite, ADSL, VDSL, HDSL all of which are broadly identified as X-DSL have been developed to increase the effective bandwidth of existing subscriber line connections. An X-DSL modem operates at frequencies higher than the voice band frequencies, thus an X-DSL modem may operate simultaneously with a voice band modem or a telephone conversation. Currently there are over ten discrete X-DSL standards, including: G.Lite, ADSL, VDSL, SDSL, MDSL, RADSL, HDSL, etc.

One of the factors limiting the bandwidth or channel capacity of any of the above discussed X-DSL protocols is distortion. The components on the transmit path of a modem inherently distort signals as they transmit them. Amplitude modulation causes distortion to become dependent on the input signal with a result of the amplified output signal is no longer simply an amplified replica of the input signal. Unfortunately if linear modulation with a fluctuating envelope is used in conjunction with nonlinear amplification, spectral spreading may occur thereby interfering with communications.

What is needed are approaches to reducing in band distortion for X-DSL modems.

SUMMARY OF THE INVENTION

An apparatus and method is disclosed for minimizing frequency distortion in the transmit path of an XDSL modem implementing digital multi-tone (DMT) line code. The transmit path of an XDSL modem introduces various non-linearities into transmissions in both the frequency and time domains. The current invention provides a means for both determining and correcting for distortion in the frequency domain. Distortion in the frequency domain may result from digital to analog conversion or analog filtering for example. The apparatus may be incorporated in an existing X-DSL architecture without additional circuitry. The apparatus may be applied with equal advantage in wired and wireless media.

In an embodiment of the invention the apparatus may include a calibration phase which may be implemented using the existing analog-to-digital (ADC) conversion and demodulation capabilities on the receive path of the modem. This calibration phase takes place before the training phase associated with establishing communications with a remote site. During the calibration phase a calibration sequence with known spectral characteristics in the frequency domain is injected digitally at the beginning of the transmit path into each of the tone bins of the inverse Fourier Transform engine (IFFT). The receive path is configured to receive feedback of a resultant analog output signal from the transmit path. A frequency analyzer is used to determine the spectral properties of the feedback from the analog output signal. A normalizer then computes scaling coefficients for each tone bit of the DMT modem by comparing all bins with one another and determining a rail or threshold against which to normalize all of the tone bins. A local gain table is then generated which incorporates the normalization factors for each tone bin. During subsequent training and run-time phases of modem operation the local gain table is utilized to equalize the inputs during each symbol interval to the tone bins of the IFFT.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

In a typical DMT system, the transmit signal passes through an IFFT engine, various digital filters, a D/A converter, and various analog components. The composite frequency response of all of these components has a certain amount of ripple/variation in the passband, whether by design or by process variation. The effect of this is that some of the tones are attenuated more than others. The current invention provides method and apparatus for flattening the transmit spectrum thus improving the bandwidth of the transmit path. One way of contributing to this result is is to design filters that are extremely flat over the passband. However, in filter design there is usually a direct trade-off of ripple for complexity, or stopband rejection. The current invention corrects for frequency distortion along the transmit path by calibrating and precompensating the various tone bins of the inverse discrete Fourier transform (IFFT) which is part of the transmit path.

The current invention provides means for reducing the filtering requirements of the transmit chain while maintaining a minimum ripple in the pass band of the filters. Increase in the allowable ripple in the pass-band of the filter will translate into reduction of the filtering requirements. The deterministic non-flat response (ripples) of the transmit chain can be corrected by multiplying the input of IFFT by the inverse of the absolute value of the frequency response of the transmit chain (the composite response of the entire chain). The procedure is applied as follows. Assume $X(k)$ for $k=0, \ldots, N-1$ are the complex constellation points corresponding to different tones. then the inverse of the frequency response of the transmit chain is defined as:

$$IH(k) = \frac{1}{\left|\sum_{n=0}^{N-1} h(n)\exp\left(j\frac{2\pi kn}{N}\right)\right|}$$

where h(n) is the discrete impulse response of the designed transmit chain (Digital and Analog), the frequency spacing between FFT tones are 4.3125 KHz. The input to the IFFT is defined as $$Y(K) = \begin{cases} X(K)IH(K) & \text{for } K \in S \\ 0 & \text{for } K \notin S \end{cases}$$

where S is the set of transmit tones.

The current invention provides a local gain table which contains precompensation scale factors for linearising the frequency response of the transmit path and means for scaling each of a plurality of discrete multi tone (DMT) subcarriers on the transmit path with a corresponding one of the precompensation scale factors from said local gain table to equalize the frequency response of the transmit path of the modem.

Figure 1:
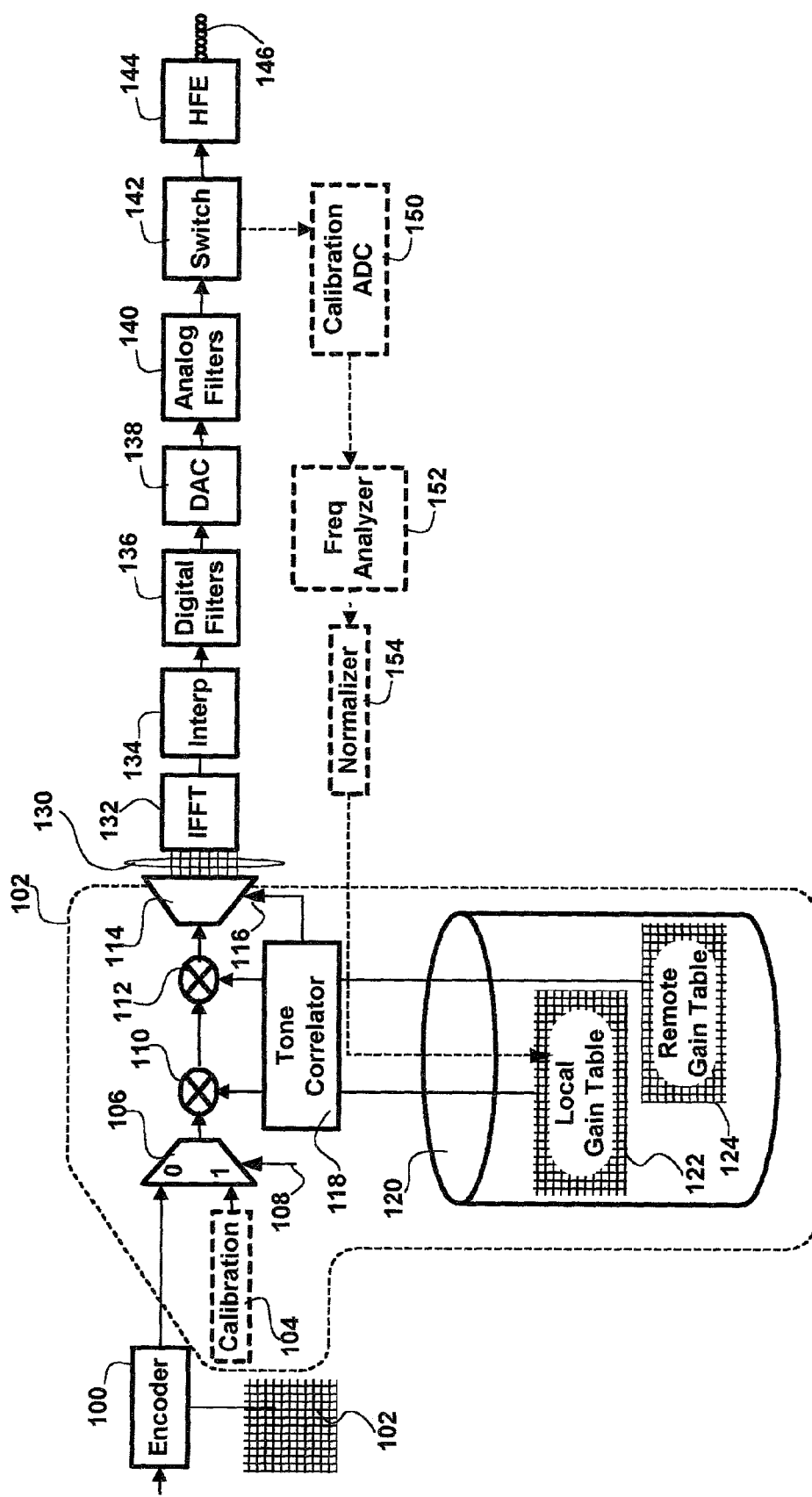
FIG. 1 is a hardware block diagram showing the transmit path of an XDSL modem incorporating both the pre-compensation and calibration features components.

FIG. 1 is a hardware block diagram showing a portion of a transmit path of an XDSL modem incorporating both the pre-compensation and calibration components. The transmit path includes an encoder 100, a gain scaler 102, an IFFT, 132, an interpolator 134, digital filters 136, a digital-to-analog converter (DAC) 138, analog filters 140, a switch 142 and a hybrid front end (HFE) coupled to subscriber lint 146. In an embodiment of the invention a calibration analog-to-digital (ADC) 150, a digital frequency analyzer 152 and a normalizer are also included.

The encoder 100 accepts sets of real number inputs and converts them using a symbol map 102 to a complex number output with one complex number output for each tone bin of the IFFT engine 132. The output of the encoder couples via multiplexer 106 to a pair of multipliers 110-112. The multipliers 110-112 accept the input of each complex number for each corresponding tone bin of the IFFT and apply tone specific gain factors from a local gain table 122 and a remote gain table 124 respectively. These tables are stored in memory 120. A tone correlator 118 controls these activities. The tone correlator also couples to the control input 116 of a demultiplexer 114 which demultiplexes each scaled complex number onto the appropriate one of tone bins 130 at the input of the IFFT 132. The IFFT converts the digital symbol from the frequency to the time domain and the digital samples resulting therefrom are passed through subsequent stages of the transmit path to the DAC 138 where they are converted to an analog output which is filtered by analog filters 140 and provided through switch 142 and the HFE 144 to the subscriber line.

The scale factors in the local gain table 122 may be generated as part of the modem design process based on the theoretical performance of the modem. Alternately, they may be uploaded from calibration equipment (not shown) during production or laboratory testing of the modem. Alternately, the precompensation/scale or gain values in the local gain table may be determined before the training of a channel. In this latter embodiment of the invention the control input 108 of the multiplexer 106 couples the multiplexer output with a calibration signal source 104. The calibration signal source may generate broadband spectral noise in the form of randomly generated complex numbers into each of the tone bins 130 of the IFFT for subsequent spectral calibration and scaling of each tone of an entire tone set. Alternately, the calibration signal source may inject a narrow band signal into one tone bin at a time for tone by tone spectral analysis and scaling. In either event, the switch 142 which normally couples the analog filters 140 to the HFE 144 would instead provide an alternate or additional coupling to a calibration ADC 150. That calibration ADC may be a discrete component of may be part of the modem's receive path. In either event, the output of the calibration ADC is digitized samples. These samples are processed in a digital frequency analyzer to determine the gain factor for each spectral component, corresponding with each tone bin. The frequency analyzer may again be a dedicated calibration component or part of the receive path, e.g. the discrete Fourier transform engine (DFT). The magnitude of each spectral component from the digital frequency analyzer output is normalized in the normalizer 154. The normalizer determines the threshold or rail or average value for the combined spectral components and then determine the normalization, scale or gain factor for each that when applied at the input to the IFFT by the multiplier 110 will equalize the frequency response of the transmit path. In an embodiment of the invention the normalizer computes the inverse gain, necessary to flatten the transmit spectrum, and stores the scale factors in the local gain table, e.g. precompensation table 122. The calibration of the transmit path may include components within the HFE depending on where the switch 142 is located. The output of the normalizer provides input to the local gain table where the scale factor for each tone bin precompensation is stored. After the precompensation or calibration phase the training phase commences. At the end of the training phase the remote site/modem transmits the remote gain table 124 to the local modem shown in FIG. 1. The remote gain table scale factors are applied to the input of each tone bin via multiplier 112.

Figure 2:
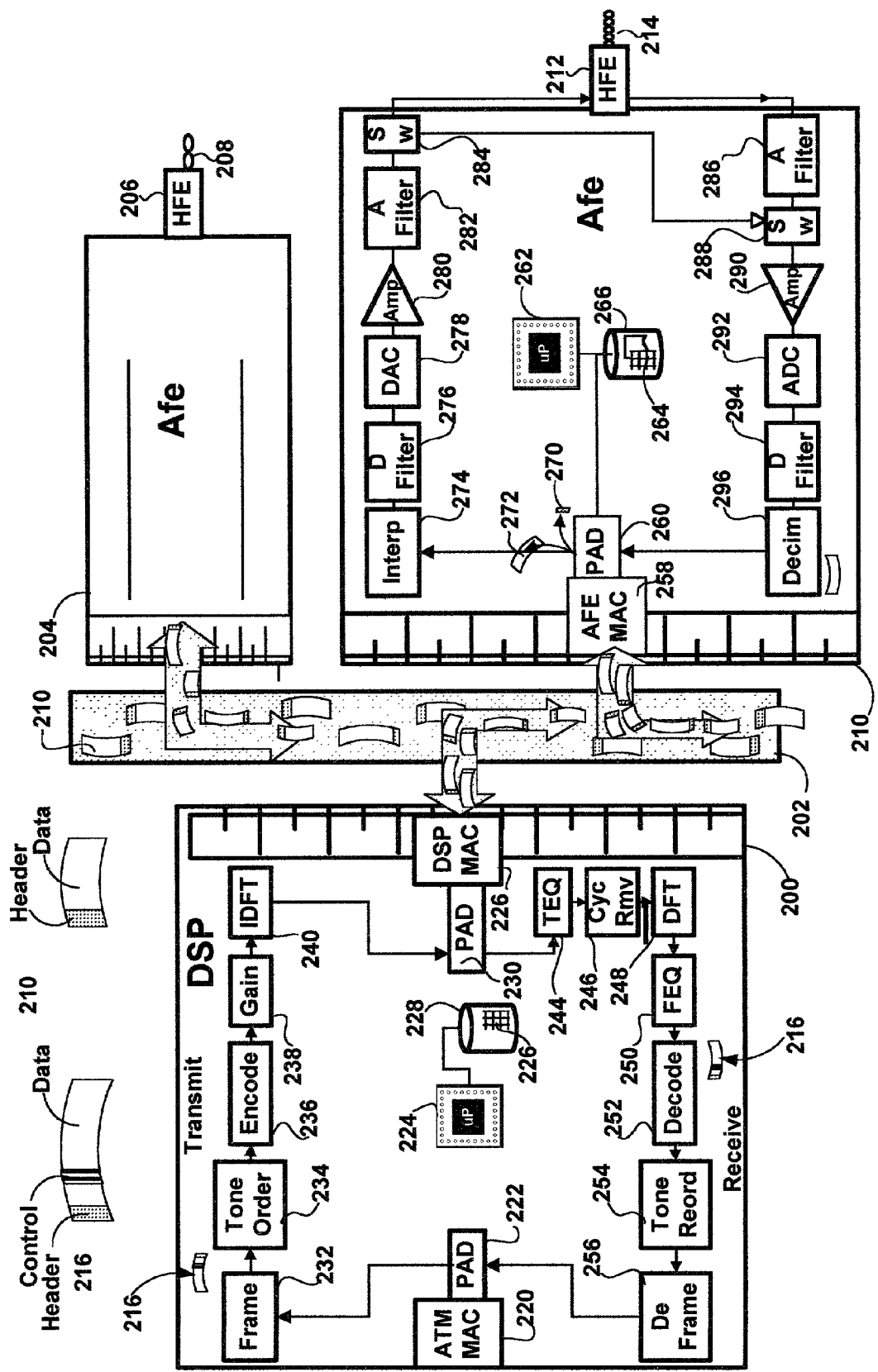
FIG. 2 is a detailed hardware block diagram of a packet based multi-channel multi-protocol XDSL logical modem which may be used to implement the current invention.

FIG. 2 is a detailed hardware block diagram of a packet based multi-channel multi-protocol XDSL logical modem which may be used to implement the current invention. In this architecture a DSP 200 handles processing for a number of channels of upstream and downstream subscriber line communications via a number of analog front ends (AFE's) 204 and 210. Each AFE in turn accepts packets associated with one or more of subscriber lines to which each AFE is coupled. AFE 204 is shown coupled via HFE 206 with subscriber line 208. AFE 210 is shown coupled via HFE 212 with subscriber line 214. The logical modem shown in FIG. 2 supports packet based processing of data between a DSP and AFE as well as within each DSP and AFE. Packet processing between DSP and AFE modules involves transfer over bus 202 of bus packets 210 each with a header and data portion. The header contains information correlating the data with a specific channel and direction, e.g. upstream or downstream, of communication. The data portion contains for upstream traffic digitized samples of the received data for each channel and for downstream packets digitized symbols for the data to be transmitted on each channel.

Packet processing within a DSP may involve device packets 216. The device packets may include a header, a control portion and a data portion. The header serves to identify the specific channel and direction. The header may contain control information for the channel to be processed. The control portion may also contain control parameters for each specific component along the transmit or receive path to coordinate the processing of the packets. Within the AFE the digitized data generated for the received (upstream data) will be packetized and transmitted to the DSP. For downstream data, the AFE will receive in each packet from the DSP the digitized symbols for each channel which will be modulated in the AFE and transmitted over the corresponding subscriber line. These modules, AFE and DSP, may be found on a single universal line card, such as line card 116 in FIG. 1. They may alternately be displaced from one another on separate line cards linked by a DSP bus. In still another embodiment they may be found displaced across an ATM network.

The DSP 200 includes, a DSP medium access control (MAC) 226 which handles packet transfers to and from the DSP bus 202. The MAC couples with a packet assembler/disassembler (PAD) 232. For received DSP bus packets, the PAD handles removal of the DSP bus packet header and insertion of the device header and control header which is part of the device packet 216. The content of these headers is generated by the core processor 224 using statistics gathered by the de-framer 256. These statistics may include gain tables, or embedded operations channel communications from the subscriber side. The PAD embeds the required commands generated by the core processor in the header or control portions of the device packet header. Upstream device packets (Receive packets) labeled with the appropriate channel identifier are passed through the time domain equalizer (TEQ) 244 and the cyclic prefix/suffix remover 246 to the discrete Fourier transform engine 248. The DMT engine fetches packets and processes the data in them in a manner appropriate for the protocol, channel and command instructions, if any, indicated by the header. The processed data is then passed to the frequency domain equalizer (FEQ) 250, the decoder 252, the tone reorderer 254 and the deframer 256. Each module reads the next device packet and processes the data in it in accordance with the instructions or parameters in its header. The processed de-framed data is passed to the ATM pad 222 for wrapping with an ATM header and removal of the device header. The ATM MAC 220 then places the data with an ATM packet on the ATM network.

Control of the receive modules, e.g. DFT engine 248, FEQ 250, etc. is implemented as follows. The core processor 224 gathers statistical information on each channel including gain tables, or gain table change requests from the subscriber as well as instructions in the embedded operations portion of the channel. Those tables 226 are stored by the core processor in memory 228. When a change in gain table for a particular channel is called for the core processor sends instructions regarding the change in the header of the device packet for that channel via PAD 230 and writes the new gain table to a memory which can be accessed by the appropriate module in the receive path. This technique of in band signaling with packet headers allows independent scheduling of actions on a channel by channel basis in a manner which does not require the direct control of the core processor. Instead each module in the receive path can execute independently of the other at the appropriate time whatever actions are required of it as dictated by the information in the device header which it reads and executes.

This device architecture allows the DSP transmit and receive paths to be fabricated as independent modules or sub modules which respond to packet header control information for processing of successive packets with different XDSL protocols, e.g. a packet with ADSL sample data followed by a packet with VDSL sampled data. For example as successive packets from channels implementing G.Lite, ADSL and VDSL pass through the DFT 248 the number of tones will vary from G.Lite, ADSL and for VDSL. The framer 232 and de-framer 256 will use protocol specific information associated with each of these channels to look for different frame and super frame boundaries. The measured level of each tone is maintained by processor 224 in memory 228. This same memory may be utilized for calculating the inverse channel model for each of the channels to determine the amount of pre-compensation to be applied to downstream data on each of the channels.

On the downstream side (Transmit path) the same architecture applies. ATM data is wrapped by PAD 222 with a device header the contents of which are again dictated by the core processor 224. That processor embeds control information related to each channel in the packets corresponding to that channel. The Framer 232, tone orderer 234, encoder 236, gain scaler 238 and inverse discrete Fourier transform (IDFT) engine 240 process these packets according to the information contained in their header or control portions of each device packet. From the IDFT 240 each updated device packet with a digitized symbol(s) for a corresponding channel is sent to PAD 230 where the device header is removed. The DSP PAD places the DSP packet 210 with an appropriate header to DSP MAC 226 for placement onto the DSP bus 202 for transmission to the appropriate AFE and the appropriate channel and subscriber line within the AFE.

During the calibration phase the core CPU 224 generates a calibration sequence which is injected into the tone bins of the IDFT 240 and passes via packets 210 to the corresponding AFE. During the operational phase a local gain table with precompensation factors for each tone bin of the IDFT 240 is maintained in memory 228 and utilized to pre-compensate each tone bin for each downstream channel to equalize the frequency response on the transmit path. Separate pre-compensation tables (i.e. local gain tables) are maintained for each channel.

Because the data flow in the AFE allows a more linear treatment of each channel of information an out of band control process is utilized within the AFE. In contrast to the DSP device packets which are used to coordinate various independent modules within the DSP the AFE accomplishes channel and protocol changeovers with a slightly different control method.

A packet on the bus 202 directed to AFE 210 is detected by AFE MAC 258 on the basis of information contained in the packet header. The packet is passed to PAD 260 which removes the header 270 and sends it to the core processor 262. The packet's header information including channel ID is stored in the core processor's memory 266. The information is contained in a table 264. The raw data 272 is passed to interpolator 274. On the transmit path, the interpolator 274 reads a fixed amount of data from each channel. The amount of data read varies for each channel depending on the bandwidth of the channel. The amount of data read during each bus interval is governed by entries in the control table for each channel which is established during channel setup and is stored in memory 266. The interpolator up samples the data and passes it to low pass filters 276 to reduce the noise introduced by the DSP. Implementing interpolation in the AFE as opposed to the DSP has the advantage of lowering the bandwidth requirements of the DSP bus 202. From the interpolator data is passed to the digital-to-analog converter (DAC) 278. The DAC converts the digitized symbol for each of the input signals on each of the input signal lines/channels to corresponding analog signals. These analog signals are introduced to the amplification stage 280, from which they are passed to analog filter 282 and then via an associated HFE, e.g. HFE 212 to a corresponding subscriber line e.g. subscriber line 214.

A switch 284 is present in the final stages of the analog portion of the transmit path. That switch during the calibration phase couples the transmit to the receive path thereby providing the feedback for the calibration of the local gain table as discussed above in connection with FIG. 1.

On the upstream path, the receive path, individual subscriber lines couple to the receive path. Subscriber line 214 couples through HFE 212 to the analog filer 286. The analog filter provides input through switch 288 to the corresponding line amplifier 290. During the calibration phase the switch 288 couples the transmit to the receive path for feedback of the calibration signal corresponding with the output on the transmit path. From the line amplifier the received analog data is digitized in the analog to digital converter (ADC) 292. The digitized output is passed through the digital filter 294 and decimator 296 to the pad 260. The PAD wraps the raw data in a DSP header with channel ID and other information which allows the receiving DSP to properly process it. From the PAD it is passed to the AFE MAC 258 for wrapping in a bus packet 210 and delivery to the DSP 200.

During the calibration phase a calibration sequence is injected into the tone bins of the IDFT 240 and modulated onto the transmit path. Feedback of the resultant analog output signal is provided along the receive path via switches 284,288. On the receive path the ADC 292 performs analog conversion, the DFT 248 conducts spectral analysis on each tone bin. The core CPU normalized the spectral components and generates the local gain table with the precompensation coefficients and stores these in memory 228. During the operational phase the gain scaler 238 scales each complex number input to each tone bin of the IDFT 240 by both a pre-compensation scale factor from the local gain table and by a gain scale from the remote gain table received from the subscriber side. These correspond to the local gain table 122 and the remote gain table 124 shown in FIG. 1.

Figure 3A:
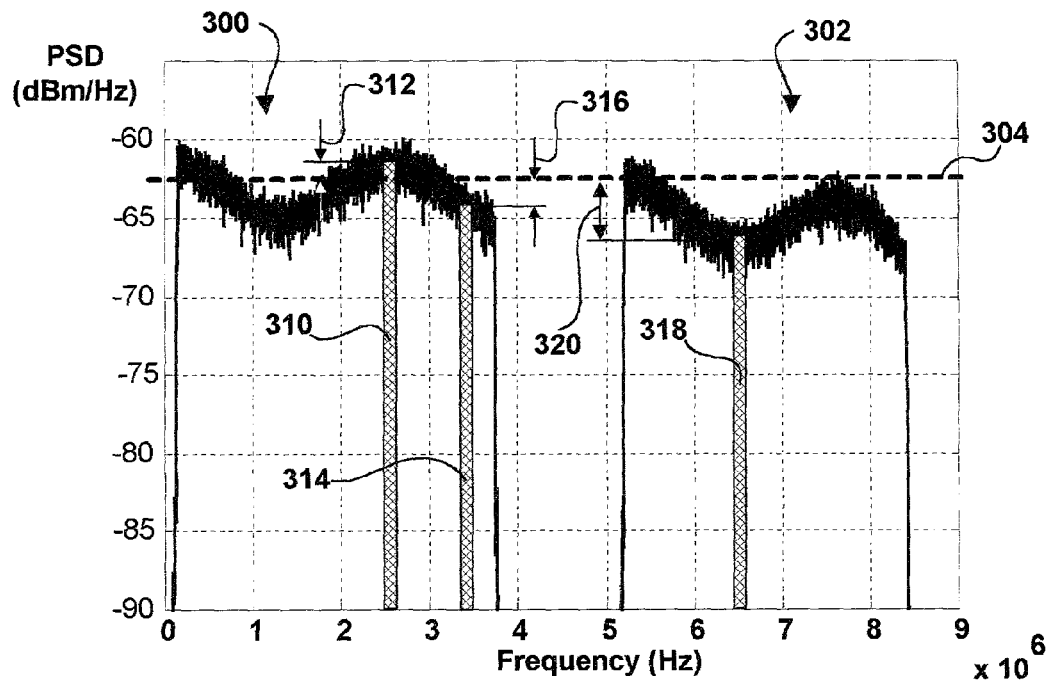
FIGS. 3A-B are graphs showing the transmit power spectrum with and without precompensation respectively.
Figure 3B:
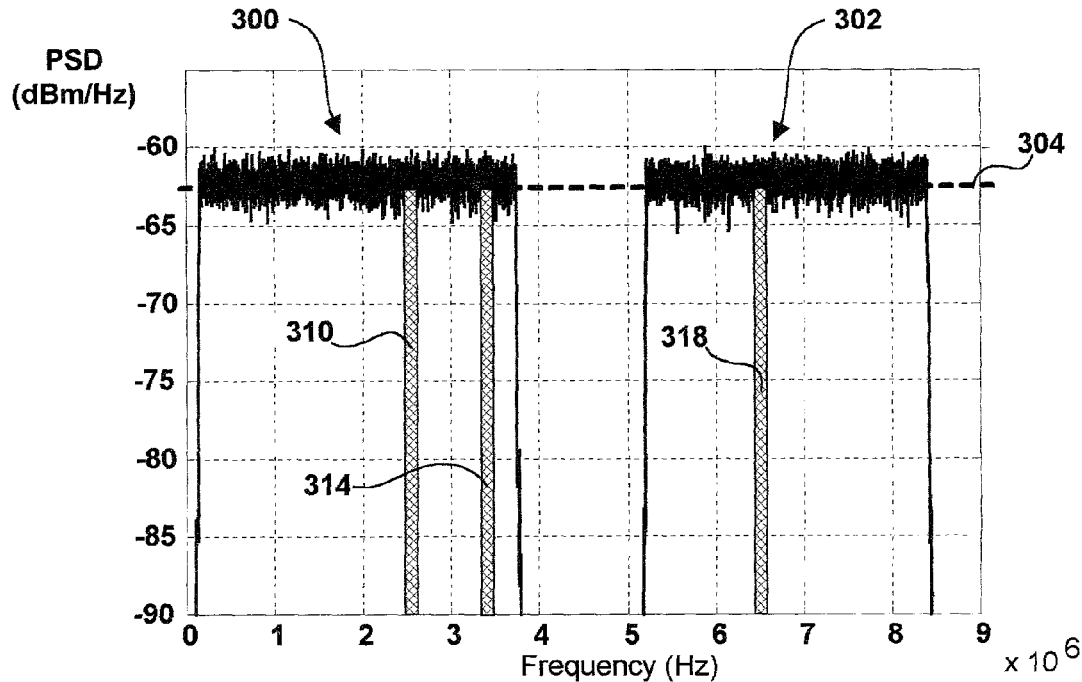

FIGS. 3A-B are graphs showing the transmit power spectrum with and without precompensation respectively. Both downsteam frequency ranges 30–302 for VDSL protocol are shown. In a typical DMT system, the transmit signal passes through an IFFT engine, various digital filters, a D/A converter, and various analog components. The composite frequency response of all of these components has a certain amount of ripple/variation in the passband, whether by design or by process variation.

FIG. 3A shows a typical plot of the power spectrum of a VDSL modem operating in the downstream direction. Assuming in this example that the maximum allowable power density (for regulatory reasons) is −60 dBm/Hz, it is clear from the plot that some of the tones are "disadvantaged" due to ripple of the filters. Tones 310, 314 and 318 are shown. A rail 304 is shown at −62.5 dBm/Hz. Tone 310 exceeds the rail by an amount 312. Tones 314 and 318 fall below the rail by amounts 316 and 318 respectively. Any method which flattens the transmit spectrum will give better system throughput. The most obvious way to accomplish this is by designing filters that are extremely flat over the passband. However, in filter design there is usually a direct trade-off of ripple for complexity, or stopband rejection. From a system standpoint, this leads up to the idea of transmitter precompensation which has been described above. In FIG. 3B all tone bins have been normalized by the application of the precompensation scale factors computed for each tone bin and stored in the local gain table.

Figure 4:
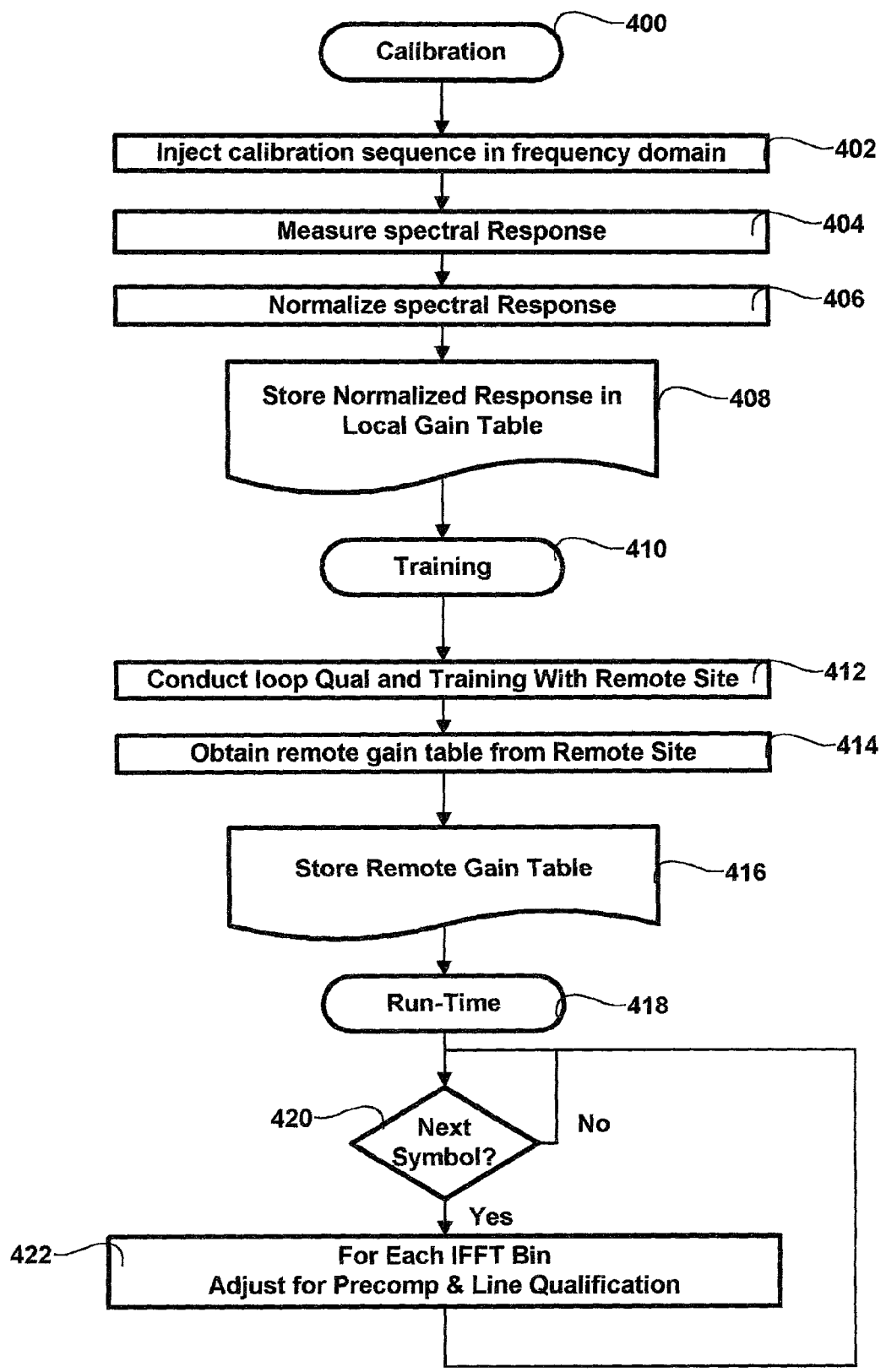
FIG. 4 is a process flow diagram of the processes associated with precompensation and calibration.

FIG. 4 is a process flow diagram of the processes associated with precompensation and calibration. Processing begins at start block 400 in which calibration is initiated. Next in process 402 the calibration sequence is injected into the individual tone bins. Next in process 404 the spectral output at the analog endpoint of the transmit path is obtained. Then in process 406 the spectral response is normalized with scale factors for each tone bin which flatten the frequency response. Then in process 408 the precompensation scale factors are stored in the local gain table. Next, the training phase 410 commences in process 412. In process 412 loop qualification and training with the remote site is effected. Then in process 414 the remote site sends the remote gain table to the local modem. In process 416 the gain table is stored by the local modem. Next is the operational or run-time phase 418 is initiated in decision process 420. In decision process 420 a determination is made as to the onset of the next symbol interval. To the corresponding set of complex coefficients the corresponding precompensation and remote scale factors are applied from the local and remote gain tables to the complex coefficient for each tone bin of the IFFT. In an embodiment of the invention these tables may be integrated with one another.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for equalizing multi-tone modulated transmissions of a modem with a transmit path and a receive path both configured to couple across a communication medium with a remote site, and the apparatus comprising:

a first set of scale factors to equalize the frequency response of the transmit path of the modem and the first set of scale factors obtained before initializing communication with a remote site, and the first set of scale factors obtained by;

a calibration signal source coupled to a digital portion of the transmit path to inject a calibration signal into selected tones;

a frequency analyzer coupled to an analog portion of the transmit path to analyze spectral components of analog signals resulting from an injection of the calibration signal by the calibration signal source;

a normalizer coupled to the frequency analyzer to determine the first set of scale factors from the spectral components analyzed by the frequency analyzer;

a gain scaler for scaling each of a plurality of tones associated with initializing communications with the remote site with a corresponding one of the first set of scale factors to equalize the frequency response of the transmit path of the modem.

2. The apparatus of claim 1, wherein the frequency analyzer further comprises:

an analog to digital conversion (ADC) component of the receive path of the modem switchably coupled to the analog portion of the transmit path to analyze spectral components of the analog signals resulting from the injection of the calibration signal by the calibration signal source.

3. The apparatus of claim 1, wherein the frequency analyzer further comprises:

a calibration analog to digital conversion (ADC) component switchably coupled to the analog portion of the transmit path to analyze spectral components of the analog signals resulting from the injection of the calibration signal by the calibration signal source.

4. The apparatus of claim 1, wherein the communication medium comprises one of a wired and a wireless medium.

5. The apparatus of claim 1, wherein the multi-tone modulated transmissions comprise at least one of the following XDSL protocols: G.Lite, ADSL, VDSL, SDSL, MDSL, RADSL and HDSL.

6. A multi-tone modem with a transmit path and a receive path configured to couple across a communication medium with a remote site, and the modem comprising:

a first set of scale factors to equalize the frequency response of the transmit path of the modem and the first set of scale factors obtained before initializing communication with a remote site, and the first set of scale factors obtained by;

a calibration signal source coupled to the digital portion of the transmit path to inject a calibration signal into selected ones of tones;

a frequency analyzer coupled to the analog portion of the transmit path to analyze spectral components of analog signals resulting from an injection of the calibration signal by the calibration signal source;

a normalizer coupled to the frequency analyzer to determine the first set of scale factors from the spectral components analyzed by the frequency analyzer;

a gain scaler for scaling each of a plurality of tones associated with initializing communications with the remote site with a corresponding one of the first set of scale factors to equalize the frequency response of the transmit path of the modem.

7. The multi-tone modem of claim 6, wherein the frequency analyzer further comprises:

an analog to digital conversion (ADC) component of the receive path of the modem switchably coupled to the analog portion of the transmit path to analyze spectral components of the analog signals resulting from the injection of the calibration signal by the calibration signal source.

8. The multi-tone modem of claim 6, wherein the frequency analyzer further comprises:

a calibration analog to digital conversion (ADC) component switchably coupled to the analog portion of the transmit path to analyze spectral components of the analog signals resulting from the injection of the calibration signal by the calibration signal source.

9. The multi-tone modem of claim 6, wherein the communication medium comprises one of a wired and a wireless medium.

10. The multi-tone modem of claim 6, wherein communications between the multi-tone modem and the remote site exhibit at least one of the following XDSL protocols: G.Lite, ADSL, VDSL, SDSL, MDSL, RADSL and HDSL.

11. A method for operating a multi-tone modem with a transmit path and a receive path configured to couple across a communication medium with a remote site, and the method comprising:

determining a first set of scale factors to equalize the frequency response of the transmit path of the multi-tone modem, including:

injecting a calibration signal into selected ones of tones in a digital portion of the transmit path;

analyzing spectral components of analog signals on an analog portion of the transmit path responsive to the injecting act;

determining the first set of scale factors from the spectral components analyzed in the analyzing act; and initializing communications between the multi-tone modem and the remote site across the communication medium with a plurality of tones each scaled with a corresponding one of the first set of scale factors to equalize the frequency response of the transmit path of the multi-tone modem.

12. The method of claim 11, wherein the analyzing act further comprises the act of:

switchably coupling an analog portion of the receive path to the analog portion of the transmit path to analyze the spectral components of the analog signals.

13. The method of claim 11, wherein the communication medium comprises one of a wired and a wireless medium.

14. The method of claim 11, wherein the initializing act further comprises:

initializing communications between the multi-tone modem and the remote site in at least one of the following XDSL protocols: G.Lite, ADSL, VDSL, SDSL, MDSL, RADSL and HDSL.

* * * * *